United States Patent

Erck

Patent Number: 5,822,045
Date of Patent: Oct. 13, 1998

[54] FILMSTRIP HOLDING APPARATUS AND METHOD

[75] Inventor: Gary Lee Erck, Webster, N.Y.

[73] Assignee: Eastman Kodak Company, Rochester, N.Y.

[21] Appl. No.: 616,815

[22] Filed: Mar. 15, 1996

[51] Int. Cl.⁶ .......................... G03B 27/58; G03B 27/62; G03B 27/64
[52] U.S. Cl. ................... 355/76; 355/72; 355/75
[58] Field of Search .................... 355/72, 73, 74, 355/75, 76; 352/227; 396/649, 650, 651

[56] References Cited

U.S. PATENT DOCUMENTS

| | | | |
|---|---|---|---|
| 1,870,091 | 8/1932 | Briechle. | |
| 4,241,987 | 12/1980 | Goldberg | 354/195 |
| 4,410,254 | 10/1983 | Niemuth et al. | 354/203 |
| 4,483,612 | 3/1983 | Binder | 355/76 |
| 4,963,997 | 10/1990 | VanScooter | 358/493 |
| 4,965,632 | 10/1990 | Jadrich et al. | 355/76 |
| 5,028,956 | 7/1991 | VanScooter | 355/72 |
| 5,400,117 | 3/1995 | Fetterman et al. | 355/75 |
| 5,453,817 | 9/1995 | Oka et al. | 355/75 |
| 5,523,820 | 6/1996 | Mooney et al. | 355/76 |
| 5,652,645 | 7/1997 | Jain | 355/53 |
| 5,663,786 | 9/1997 | Miyamori | 355/72 |
| 5,668,625 | 9/1997 | Bocklisch et al. | 355/73 |

*Primary Examiner*—R. L. Moses
*Assistant Examiner*—Shival Virmani
*Attorney, Agent, or Firm*—Gordon M. Stewart

[57] ABSTRACT

A filmstrip holding apparatus for supporting a filmstrip having image frames to be scanned with reduced transverse curl is disclosed. The filmstrip holding apparatus includes a base defining a channel, the channel including a bottom surface having an aperature and two opposed parallel sides to accomodate the filmstrip lengthwise past the aperture; and a clamp having two opposed elongated clamping members and a support frame extending between the clamping members to hold them in their opposed relationship. The clamp is moveable between a rest position in which a lower surface of each clamping member is spaced from the base to allow lengthwise passage of the filmstrip past the aperture, and a clamping position in which the lower surface of each clamping member lies adjacent to the base to capture the filmstrip between the clamping members and the base at positions along the base on opposite sides of the aperture, said clamping members having a length equal to the length of the image frame and at least ½ the width of the channel.

19 Claims, 6 Drawing Sheets

FIG. 6

FILMSTRIP HOLDING APPARATUS AND METHOD

FIELD OF THE INVENTION

This invention relates to an apparatus for holding a filmstrip in position, particularly during a scanning operation, and a scanning method which can use such an apparatus.

BACKGROUND OF THE INVENTION

Conversion of analog images into digital data has become widespread for a variety of applications, including storing, manipulating, transmitting and displaying or printing copies of the images. For example, images captured in photographic media are being converted to digital data and stored on compact discs for readout and display as a video image or for printing with various types of color printers. In order to capture the photographic image digitally, an image frame of a photographic filmstrip is scanned with a light beam or line, and the light transmitted through the image is detected, typically as three primary color light intensity signals, and digitized. The digitized values may be formatted to a standard for video display and stored on compact disc or magnetic media. Such film digitizers take a variety of forms and the various common aspects of film digitizing, particularly line illumination and linear CCD-based digitizers, are described in greater detail in commonly assigned U.S. Pat. No. 5,012,346.

In order to perform line scanning of an image frame of photographic filmstrips, it is necessary to provide an accurate film transport mechanism to transport a filmstrip into a scanning gate and hold the image frame flat in alignment with a scanning aperture. Typically, the linear CCD array and scanning light beam are stationary so that the light beam illuminates a line of the filmstrip image frame, and a line of digitized data is stored. The scanning gate is incrementally moved line-by-line until the entire image frame is digitized. Then a new image frame is positioned and flattened for scanning and digitizing. Such a scanning and digitizing system for Photo-CD conversion is embodied in the KODAK® PIW Model 2400 Photo-CD scanner system marketed by the assignee of this application, as well as in allowed U.S. patent application Ser. No. 08/201,282 entitled "Film Scanner with In-Line Dual Scanning Gates". That application and all other references cited in the present application, are incorporated herein by reference.

To obtain high resolution scans it is necessary that the entire image be held flat in the plane of focus for the CCD (typically defined by a lens in front of the CCD). Clearly, any part of the image out of the plane of focus will be blurred to some degree. In practice, filmstrips tend not to be perfectly flat, and often have a transverse curl (that is, they have a curvature between their side edges). Furthermore, the intensity of the light source may cause some heating of the filmstrip and cause it to transversely distort even if it was initially transversely flat.

Various devices for holding films in place have been previously described in the following U.S. Pat. Nos.: 1,870,091; 4,410,254; and 4,241,987. Particularly useful holders for a filmstrip during scanning, are described in U.S. Pat. No. 5,400,117. The filmstrip holders described in the '117 patent use four clamping members. Two longitudinal clamping members are just slightly longer than an image frame and approximately equal to the width of the filmstrip. These clamping members engage against side margins of the filmstrip on either side of an image. Two additional laterally extending clamping members are present which extend between ends of the longitudinal clamping members, to clamp the filmstrip in the image separation margins between successive image frames. While such a holding apparatus functions well, there is a risk that with filmstrips having very narrow image separation margins, the laterally extending members will partially engage the image area itself, possibly causing damage to the image area as well as blocking portions from being scanned. Lateral clamping members very close to image areas being scanned can also possibly cause reflection of light into the imaging lens resulting in flare. Additionally, even when the clamping members are spaced away from the filmstrip to allow it to move lengthwise, the laterally extending clamping members may still rub against the image area of filmstrips having a high transverse curl.

It would be desirable then to have a filmstrip holding apparatus, and a method of scanning a filmstrip, which can hold an image frame of a film to be scanned, flat in the plane of focus of the scanner, which can be used with filmstrips having very narrow image separation margins, and which will allow even filmstrips with high transverse curl to pass by freely.

SUMMARY OF THE INVENTION

The present invention provides a filmstrip holding apparatus which is particularly useful for holding a filmstrip during a scanning operation, comprising:
  a) a base having an aperture, to accomodate the filmstrip lengthwise past the aperture;
  b) a clamp having two opposed elongated clamping members and a support frame extending between the clamping members to hold them in their opposed relationship, the clamp being movable between a rest position in which a lower surface of each clamping member is spaced from the base to allow lengthwise passage of the filmstrip past the aperture, and a clamping position in which the lower surface of each clamping member lies adjacent the base to capture the filmstrip between the clamping members and the base at positions along the base on opposite sides of the aperture, said clamping members having a length at least 1½ times the distance between them when in the clamping position.

The present invention also provides a filmstrip scanning apparatus incorporating a filmstrip holding apparatus of the present invention. The scanning apparatus also has a light source and light sensor on opposite sides of the aperture, such that light from the light source can pass through the aperture and a filmstrip therein to the sensor.

The present invention also provides a method of holding a filmstrip having image frames positioned between filmstrip edges, which is particularly useful as part of a method of scanning a filmstrip, and which method can use any apparatus of the present invention or any other suitable apparatus. The method comprises:
  moving the filmstrip lengthwise past an aperture in a base of a clamping apparatus, which apparatus also has two opposed elongated clamping members;
  wherein the filmstrip is moved until an image frame (which in a scanning operation will be the frame to be scanned) is above the aperture;
  clamping the filmstrip in position by moving the clamping members downward from a rest position to a clamping position so as to capture, between the clamping members and the base, respective filmstrip edge portions along the length of the image frame to be scanned and an additional distance beyond the ends of the image frame of at least ¼ the image frame width.

Following the above steps, the image frame can be scanned if the operation to be performed on it is a scanning operation.

A filmstrip holding apparatus and scanner incorporating such an apparatus, as well as the method of the present invention, allow for holding an image frame of a film to be scanned flat in the plane of focus of the scanner. The length of the clamping members assists in maintaining this flatness without the need for lateral clamping members. Transverse tensioning of the filmstrip through the clamping members provides an additional means of maintaining flatness. The apparatus and method can be used with filmstrips having very narrow image separation margins there being no need for lateral clamping members or other elements which might contact or overlap an image area to be scanned. The apparatus and method can also allow filmstrips with high transverse curl to be readily scanned without undue contact of image areas. Additionally, transverse distortion which might be induced in an image frame to be scanned, such as by a light source, can be reduced.

DRAWINGS

Embodiments of the invention will now be described with reference to the drawings in which.

EMBODIMENTS OF THE INVENTION

It will be understood that throughout this application, when words such as "upper", "lower" and the like are used, they are used in a relative sense only. However, such words do indicate absolute positions with reference to the typical orientation which an apparatus or method of the present invention will be used, although other orientations are possible. It will also be understood that a "filmstrip" can have as few as one image frames, although it typically will have two or more, such as 5 or more (for example, 5 to 20 frames or 10 to 20 frames). Often such filmstrips are transparencies carrying negative images but they need not necessarily be so.

The holding apparatus of the present invention preferably has, as the base, an elongated channel having a bottom surface and two opposed parallel sides, to accommodate the filmstrip lengthwise therethrough, the channel having an aperture in the bottom surface. The opposed elongated clamping members in this case are positioned along respective sides of the channel and a support frame extending between the clamping members to hold them in their opposed relationship. Further, when the clamp is in the rest position a lower surface of each clamping member is spaced from the channel bottom surface to allow lengthwise passage of the filmstrip through the channel. When the clamp is in the clamping position, the lower surface of the each clamping member lies adjacent the bottom channel surface to capture the filmstrip between the clamping members and the bottom surface of the channel at positions along the bottom surface between the sides and aperture. The clamping members in such case have a length at least 1½ times the width of the channel.

The clamping members of a filmstrip holding apparatus of the present invention, preferably are of a length at least 1⅔ times the width of the channel. Such length can even be 1¾ times the width of the channel, and is preferably about twice the width of the channel. By "width" of the channel in this regard, is meant the distance between the opposed parallel sides of the channel (the sides being spaced just slightly greater than the width of the filmstrip to be handled, so as to accommodate the width of the filmstrip in the channel without undue friction with filmstrip edges).

It will be appreciated that the clamping members, when in the clamping position, will typically extend an equal amount beyond either end of the aperture (and this is preferably so). Thus, for example, when in the clamping position they will extend at least ¼ (or even ⅓, but preferably ½) the width of the channel beyond each end of the aperture. However, it is possible to use an aperture that is substantially longer than an image frame of a filmstrip. Thus, in the method of the present invention it is sufficient if the clamping members will, when in the clamping position, extend beyond the end of the image frame to be scanned by a distance of at least ¼ (or even ⅓ but preferably ½) the channel width.

Preferably, when the clamp is in the rest position, the lower surfaces of the clamping members are within the channel. With this construction, a filmstrip to be scanned can be moved lengthwise through the channel with the clamp acting as a guide to limit the filmstrip from moving upwardly out of the channel.

In the case of the support frame, this preferably comprises two frame members (preferably "flexures", that is resilient members) each of which extends between opposed positions of the clamping members. By such an arrangement, the frame members and clamp members define a clamp opening such that a light source can shine from one side of the aperture, through a filmstrip held in the holding apparatus and the clamp opening, to be detected on a suitable sensor. Preferably, the clamp opening will in fact be at least coextensive with the aperture although in the case of an oversized aperture as discussed above, this need not necessarily be so. Preferably, each of the two frame flexures extends upward and transversely inward from opposed positions of the clamping members which are lengthwise beyond the aperture.

The support frame is preferably constructed to cause the clamping members to move outwardly toward the channel sides upon contact with the filmstrip when the support frame is urged downwardly to move the clamp from the rest position to the clamping position. Such an arrangement causes an elongated filmstrip to be transversely tensioned to reduce any transverse curvature. To facilitate this, the respective lower surfaces of the clamping members are made of a pliable material.

Preferably, the clamp additionally comprises at least one set of upper and lower parallel arms (preferably flexures biased to hold the clamp members in the rest position) connected to the support frame. These arms extend an equal distance transversely from respective points on the support frame to respective remote points, and maintain the clamping members equidistant from the bottom surface of the channel between the rest and clamping positions.

In the method of the present invention, the light source of the scanning apparatus heats the image frame during scanning. It is preferred in such case that the clamping members sufficiently transversely tension the filmstrip to reduce (and preferably substantially prevent) transverse curling of the image frame which would otherwise result from heating by the light source absent the transverse tension from clamping members.

Turning now to FIGS. 1–6, the filmstrip holding apparatus shown is generally designated by numeral 20. Apparatus 20 is intended for use with a filmstrip 2 which has a width defined between parallel longitudinal edges 4 and edge margins 6 defined between edges 4 and respective image area longitudinal boundaries 12. Edge margins may or may not bear a series of perforations (none are present in the filmstrip 2 shown). Each image area (which bears a representation of a person 14) has a width (designated by numeral 8) defined between two parallel longitudinal edges 12 and a length defined between two parallel lateral edges 10, there being interimage margins 16 between successive images.

Apparatus 20 has a channel member 22 with an elongated channel 23 therein which has two open ends 24. Channel 23 has a bottom surface generally designated 28 (best seen in FIGS. 3 and 4) which includes two parallel edge margins 29 and undercut center portions 30 which extend from the respective open ends of channel 23 then curve upwardly to margins 39 which are at the same height as edge margins 29. Channel 23 also has a width defined by two opposed parallel channel sides 32 which are spaced apart slightly greater than the width of filmstrip 2 to be accommodated by the apparatus. An aperture 34 is present in bottom surface 28 (best seen in FIG. 5) and is positioned centrally between sides 32 of channel 23. Aperture 34 is generally rectangular in shape and has a width defined between two aperture sides 36, and is of a width and length slightly greater than the width and length of an image area of filmstrip 2 to be accommodated by the apparatus 20. Thus, since aperture 34 has a width less than bottom surface 28 (in fact, in the embodiment shown aperture 34 is equal in width to undercut portions 30 of bottom surface 28), aperture 34 defines in the bottom surface between aperture sides 36 and channel sides 32, parallel aperture margins 38 (which are extensions of edge margins 29). It will be understood that aperture 34 could be of different dimensions than those shown, it being desirable that aperture 34 is larger than the dimensions of an image frame to be scanned.

Apparatus 20 further has a clamp generally designated 50. Clamp 50 has two elongated parallel clamping members 52 positioned along, but slightly spaced transversely inward from, respective sides 32 of channel 28. Each clamping member 52 is made of two portions, namely a relatively rigid L-shaped frame component 54 and a lower elongated cylindrical portion 56 attached thereto. A lower surface 60 of each cylindrical portion 56 defines a lower surface of each clamping member 52. Each cylindrical portion 56 is made from a pliable material such as urethane, neoprene or silicon rubber O-ring seal material having a relatively high coefficient of friction to frictionally engage a filmstrip, and is cemented to a corresponding frame component 54 of clamping member 52. Each clamping member 52 has a length (as measured on lower surfaces 60 of portions 56) which is about twice the width of channel 23.

Clamp 50 further includes a support frame 70 to hold clamping members 52 in their opposed, parallel relationship. Support frame 70 has two frame members 72 each of which extends between corresponding opposed positions of clamping members 52, namely opposed ends of members 52, as shown in the drawings. Each member 72 is a flexure of thin metal which as shown, extends upward and transversely inward (that is, laterally inward) from opposed ends of the clamping member to a corresponding connector 76. By "flexure" in this regard means that ends of members 72 connected to clamping members 52 can be resiliently flexed upward or downward about connector 76. Frame members 72 and clamping members 52 define between them, a clamp opening which is wider than an image frame of filmstrip 2 and about twice the length of such a frame, and which clamp opening is centrally aligned with aperture 34. Thus, it will be appreciated that frame members 72 extend from positions of clamping members 52 which are lengthwise beyond aperture 34.

Clamp 50 additionally has two parallel sets of arms, each set having two parallel arms, namely an upper arm 100 and a lower arm 102. Arms 100 and 102 extend an equal distance transversely from respective connectors 76 on support frame 70 (which are transversely intermediate clamping members 52), to respective remote points 104. When holding apparatus 20 is in use, points 104 are typically attached to the remainder of a scanner (specifically, a translation stage thereof) indicated by reference numeral 200 in FIGS. 3–6. Arms 100, 102 are flexures of thin metal. By "flexures" is meant that arms 100, 102 can resiliently bent upward and downward. Clamp 50 also has an upper brace member 106 extending between the two upper arm flexures 100, and a lower brace member 108 extending between the two lower arm flexures 102. Thus, upper arm flexures 100 and upper brace member 106, and lower arm flexures 102 and lower brace member 108, define two parallel members that are H-shaped as viewed in the direction with FIG. 2 upright (or I-shaped as viewed in the direction with FIG. 1 upright).

Figure 1:
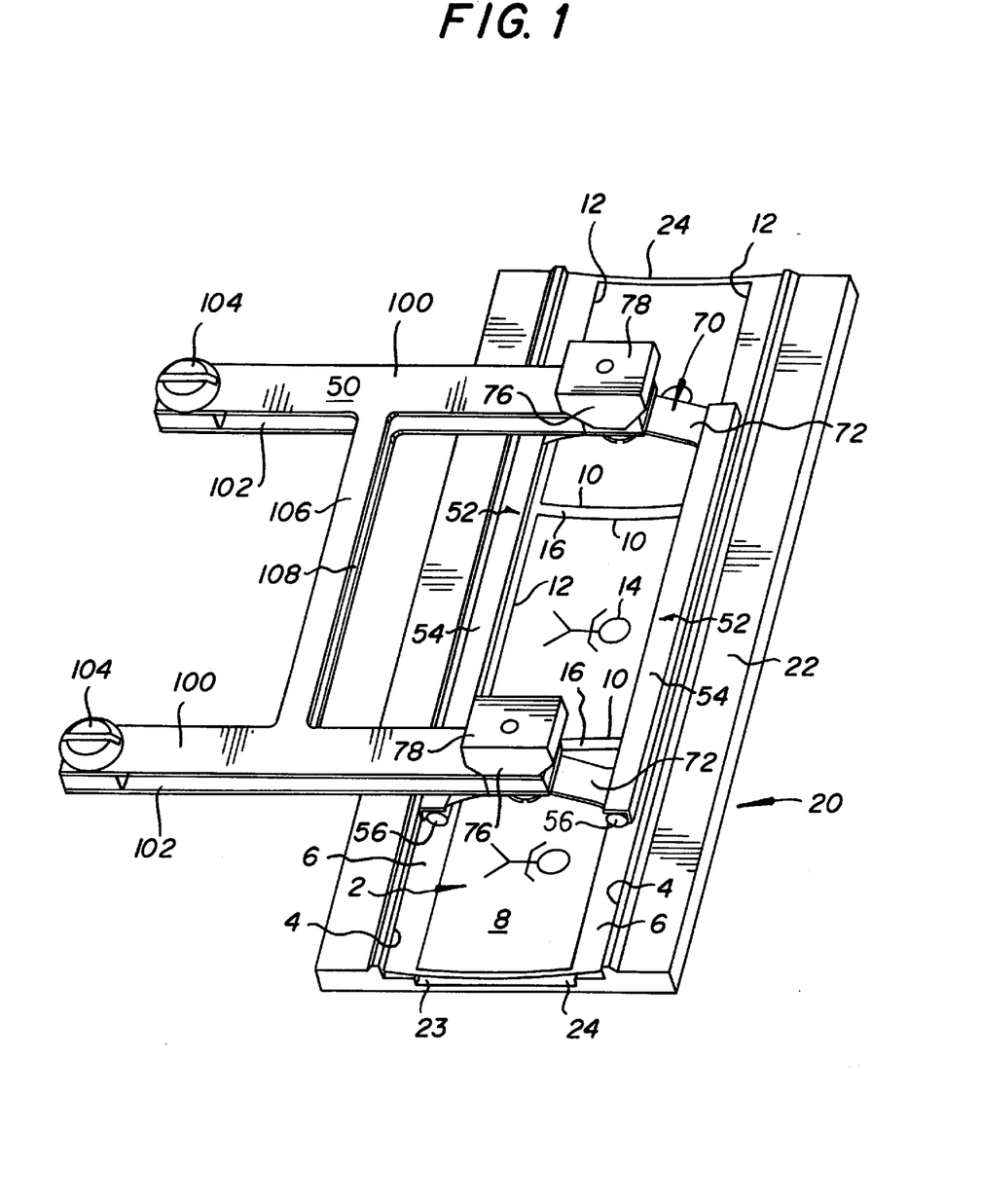
FIG. 1 is a perspective view of a filmstrip holding apparatus of the present invention.
Figure 2:
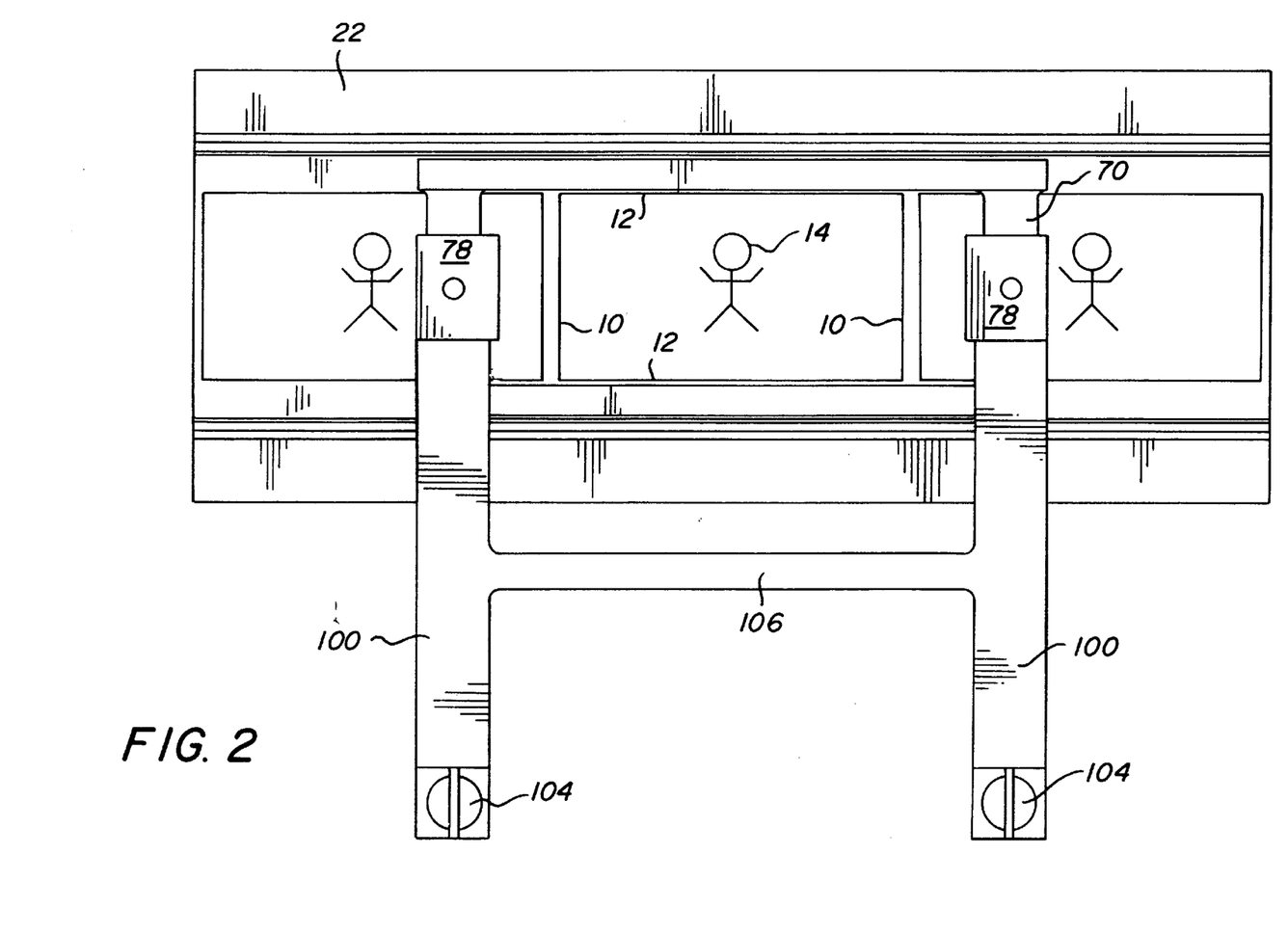
FIG. 2 is a top plan view of the apparatus of FIG. 1.
Figure 3:
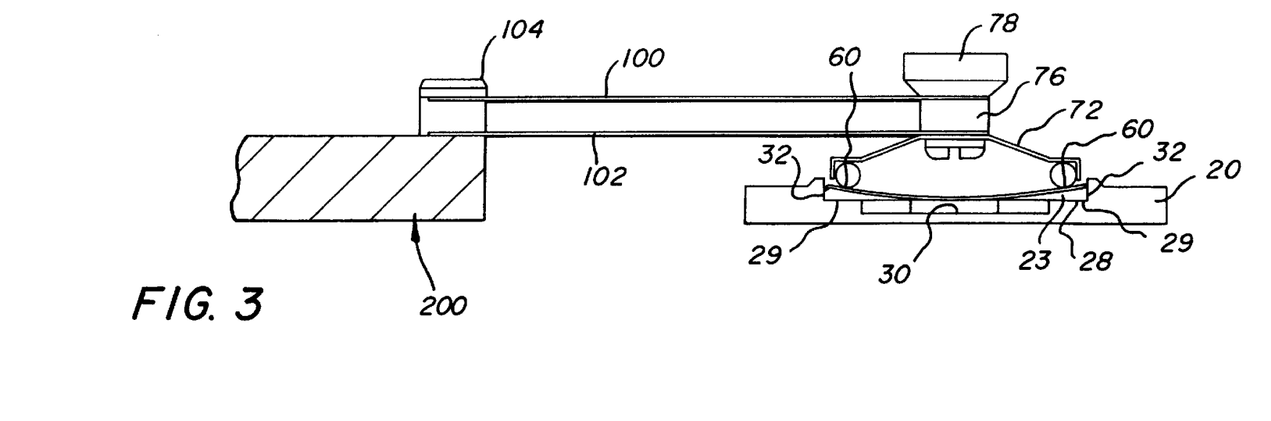
FIG. 3 is an end elevation view showing the clamp of the apparatus in its rest position.
Figure 4A:
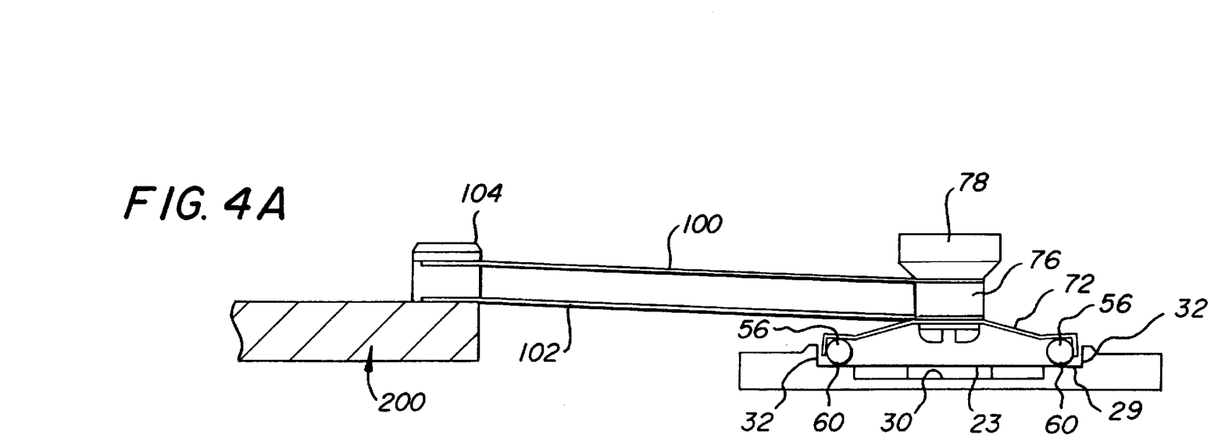
FIG. 4A is an end elevation view the same as in FIG. 3, but showing the clamp of the apparatus in the clamping position.

At this time, it will be noted that because of the construction of flexures 100 and 102, they will be biased to hold clamp 50 in a rest position, as best seen in FIGS. 1 and 3. In the rest position, lower surface 60 of each clamping member 52 is spaced from the channel bottom surface 28 (specifically edge margins 29 thereof) but are still positioned within channel 23. In this manner clamp 50 (specifically lower surfaces 60) can retain a filmstrip 2 in channel 23 by acting as a means which limits vertical motion of filmstrip 2. However, since lower surfaces 60 are spaced from bottom surface 28 of channel 23, clamp 50 when in the rest position shown in FIG. 3, still allows lengthwise motion of a filmstrip 2 through channel 23.

Figure 4B:
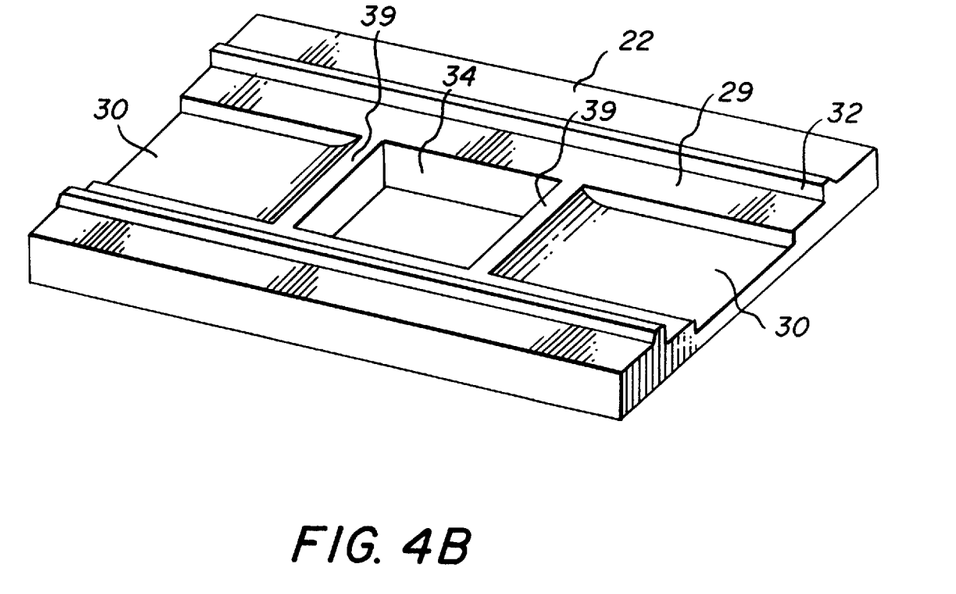
FIG. 4B is a perspective view of the channel and aperture only of the apparatus.
Figure 5:
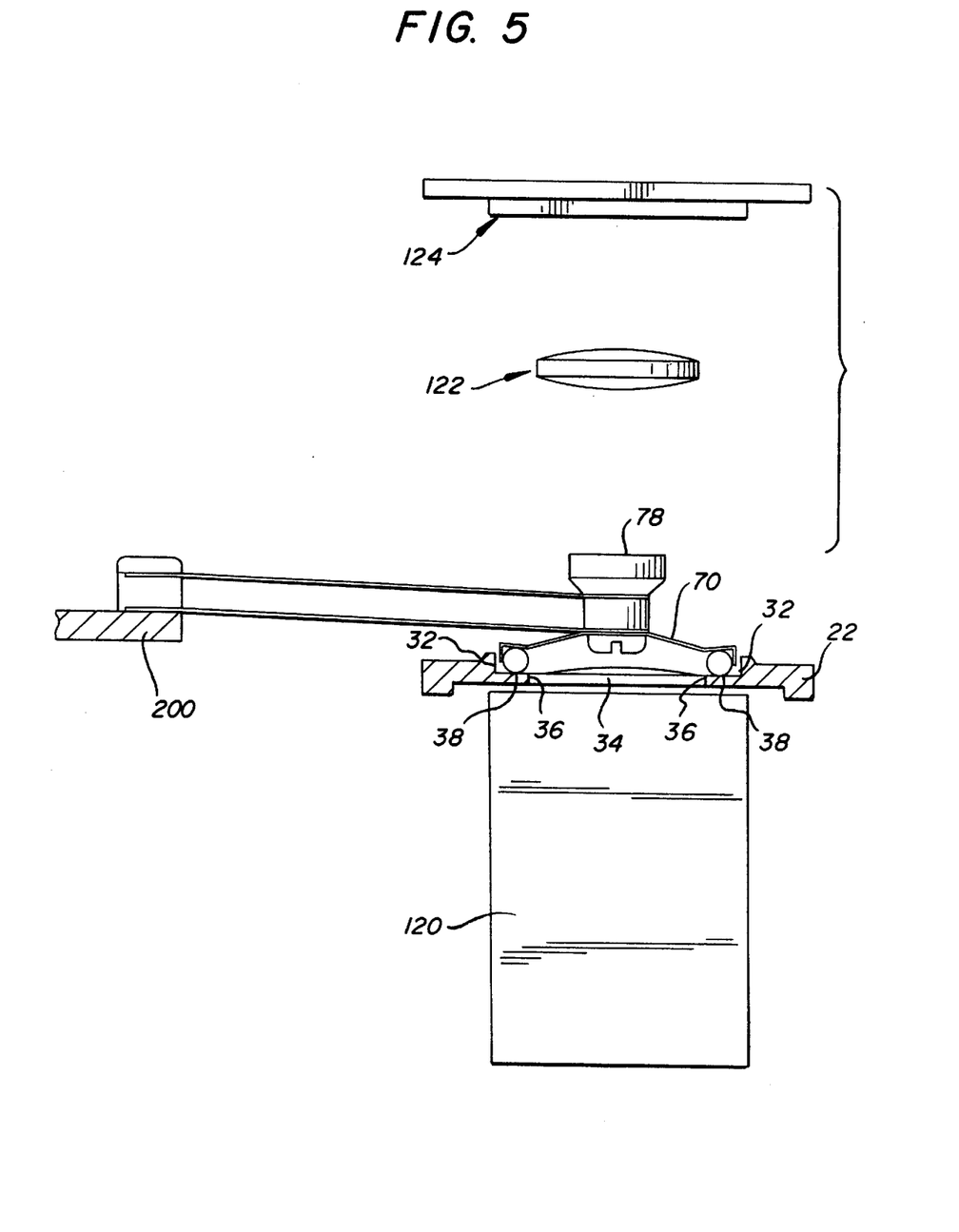
FIG. 5 is a vertical cross-section of a scanner of the present invention, showing a film holding apparatus of the present invention, some other scanner components being shown schematically.

Flexures 100, 102 can be resiliently flexed downward from their position when clamp 50 is in the rest position (such as by application of a downward force to respective top surfaces 78 of contact points 76), to move clamp 50 into a clamping position as best seen in FIGS. 4 and 5. When in the clamping position lower surfaces 60 of clamping members 52 will lie adjacent the bottom surface 28 thus capturing a filmstrip 2 between them. Specifically, lower surfaces 60 will lie adjacent to, and capture a filmstrip 2 by its edge margins 6, along the length of aperture margins 38 and beyond each end of aperture 34 by a distance of ½ the width of channel 23. Further, because of the parallel construction of flexures 100, 102 and their equal length, they will maintain clamping members 52 an equal distance from the channel bottom surface 28 between the rest and clamping positions of clamp 50.

It will also be noticed that when clamp 50 has moved part-way from its rest to clamping positions, lower surfaces 60 of clamping members 52 will contact filmstrip edge margins 6 and will tend to grip them due to the high friction coefficient of cylindrical portions 56. As clamp 50 continues to move downward to the clamping position the center portion of frame flexures 72 (attached to points 76) will begin to flex downward. This will tend to push clamping members 52 laterally outward toward respective sides 32 of channel 23. However, as lower surfaces 60 are frictionally engaged with a filmstrip edge margins, the filmstrip will be laterally tensioned as clamp 50 moves into the clamping position.

As already mentioned, channel member 22 and points 104 typically are attached to, and form part of, a translation stage of a scanner such that the entire assembly reciprocates lengthwise. A filmstrip to be scanned is fed lengthwise through an open end 24 of channel 23 with clamp 50 in the rest position, until an image frame is aligned above aperture 34. At the same time, lower surfaces 60 within channel 23 act as an upward guide, as already mentioned. There are no laterally extending clamping members which might rub against the image area of the filmstrip.

Clamp 50 is then moved to the clamping position by a suitable downward force applied to surfaces 78 to capture edge margins 6 of a filmstrip and laterally tension the film. The fact that clamping members 52 will clamp filmstrip edge margins 6 along the length of the image frame to be scanned and an additional distance beyond both ends of the image frame of ½ the channel width, reduces any transverse curl of the image frame to be scanned. In particular, there is a tendency for a filmstrip transversely tensioned by clamping members 52, to continue to exhibit or form a transverse curl 18 near the ends of clamping members 52. However, such transverse curl will not significantly extend to the image frame to be scanned when the clamping members extend sufficiently far beyond the ends 10 of that image frame.

Figure 6:
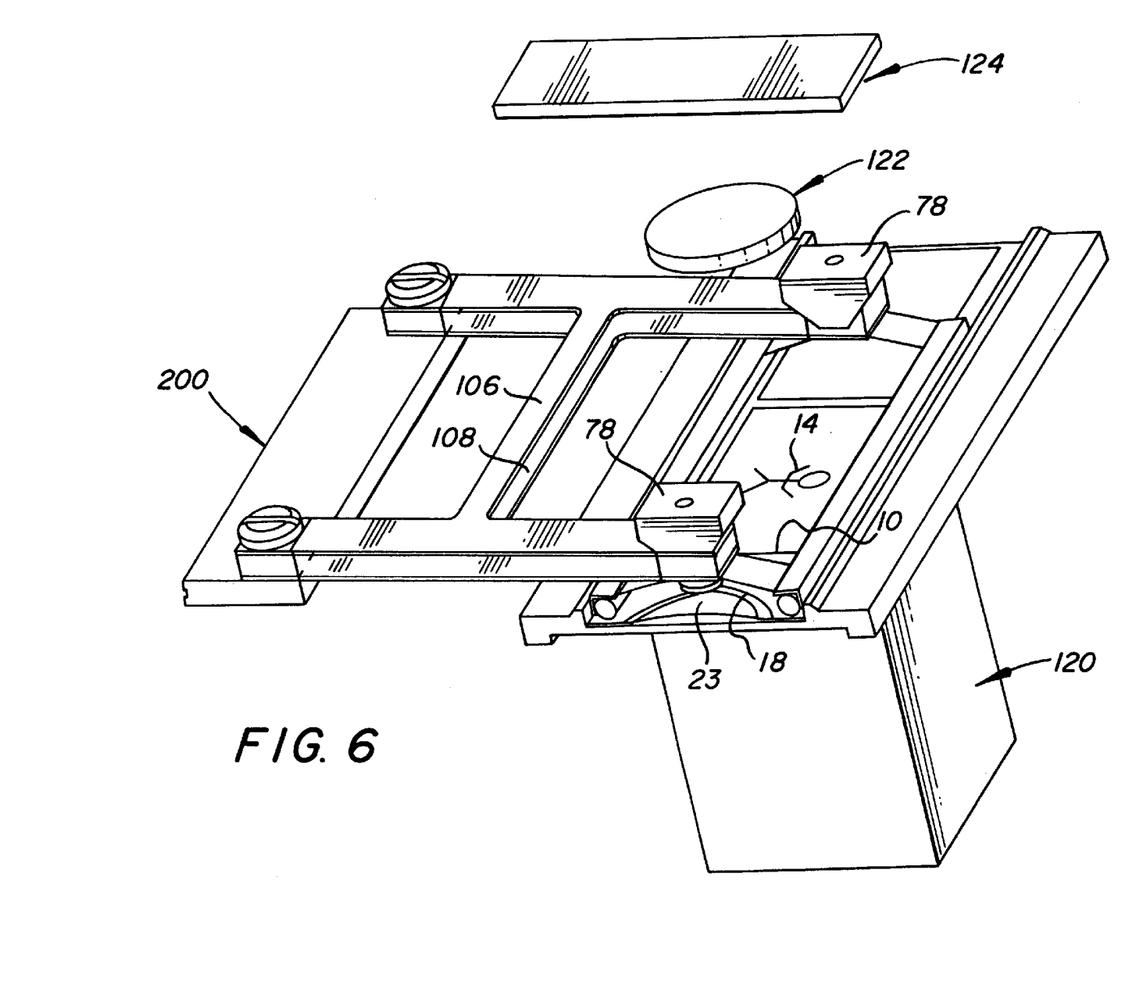
FIG. 6 is a perspective view of the scanner of FIG. 5.

With the image frame to be scanned clamped in position by clamp 50, the apparatus 20 would be moved lengthwise line by line by a transport mechanism (not shown) known in the art. A suitable scanner with a translation stage is the KODAK® PIW Model 2400 Photo-CD scanner system marketed by the assignee of this application. The foregoing reference and all other references cited in the present application, are incorporated herein by reference. However, apparatus 20 could be used in any scanner or any other device where it is desirable to maintain a filmstrip image frame in a plane (for example, in a photographic printer). FIGS. 5 and 6 schematically illustrate the positioning of holding apparatus 20 in a scanner, with 200 representing part of the remainder of the scanner (such as the scanner translation stage). A light source 120 is positioned to shine through the aperture 34 and a filmstrip image frame aligned and clamped in position therewith. Light will shine through the clamp opening above the aperture 34, through an imagin lens system 122 and onto three color filtered CCD linear arrays (generally designated 124) to produce, in combination with suitable circuitry (not shown) a digital signal corresponding to the scanned image.

Some heating of the image frame to be scanned will typically occur because of light from source 120. This will tend to induce a transverse distortion in the form of an elongated bubble in the scanned image frame. Such tendency can be counteracted by sufficient transverse tensioning from clamping members 52. While the amount of transverse tensioning will vary depending on light source 120 and the particular filmstrip, in practice it has been found that a transverse tensioning force of about 11.2 pounds will substantially prevent transverse distortion as a result of heating from the light source and maintain the image frame to be scanned substantially flat.

It should be noted that in any scanner, a downward force can be applied to surfaces 78 by any suitable means. However, it is preferred that the downward force be supplied by motor driven cams or similar arrangement acting directly or indirectly on surfaces 78. Such means allows for smooth movement of clamp 50 from the rest to clamping positions. Use of a solenoid for this purpose is considered far less desirable since solenoids can create an undesirable bounce when clamps reach the clamping position.

The preceding examples are set forth to illustrate specific embodiments of this invention and are not intended to limit the scope of the invention. It will be understood that variations and modifications can be effected within the spirit and scope of the invention.

Parts list 2 filmstrip
4 parallel longitudinal edges
6 edge margins
8 image area width
10 two parallel lateral edges
12 longitudinal boundaries
14 a person
16 interimage margins
18 transverse distortion
20 holding apparatus
22 Channel Member
23 Channel
24 Two Open Ends
28 bottom surface
29 Two Parallel Edge Margins
30 Undercut Center Portion
32 Channel Sides
34 Aperture
36 Aperture Sides
38 Aperture Margins
50 Clamp
52 Clamping Members
54 Frame Component
56 Cylindrical Portion
60 Lower Surfaces
70 Support Frame
72 Frame Members
76 Connectors
78 Top Surfaces
100 Two Upper Arm Flexures
102 Lower Arm Flexures
104 Points
106 Upper Brace Member
108 Lower Brace Member
120 Light Source
122 Imaging Lens System
124 b 3Colored Filter CCD Linear Arrays
200 Reference Numeral

I claim:
1. A filmstrip holding apparatus for supporting a filmstrip having image frames to be scanned with reduced transverse curl, comprising:
   a) a base defining a channel, the channel including a bottom surface having an aperture and two opposed parallel sides to accommodate the filmstrip lengthwise past the aperture; and
   b) a clamp having two opposed elongated clamping members and a support frame extending between the clamping members to hold them in their opposed relationship, the clamp being movable between a rest position in which a lower surface of each clamping member is spaced from the base to allow lengthwise passage of the filmstrip past the aperture, and a clamping position in which the lower surface of each clamping member lies adjacent to the base to capture the filmstrip between the clamping members and the base at positions along the base on opposite sides of the aperture, said clamping members having a length equal to the length of the image frame and at least ½ the width of the channel.

2. An apparatus according to claim 1 wherein said clamping members have a length equal to the length of the image frame and at least ⅔ the width of the channel.

3. An apparatus according to claim 1 wherein the lower surfaces of the clamping member, when the clamp is in the rest position, are positioned within the channel so that the clamp retains the filmstrip in the channel during lengthwise passage of the filmstrip through the channel.

4. An apparatus according to claim 1 wherein when the clamps are in the clamping position, the clamping members extend beyond each end of the aperture by a distance of at least ¼ the width of the channel.

5. An apparatus according to claim 1 wherein the support frame comprises two frame members each of which extends between opposed positions of the clamping members, such that the frame members and clamping members define a clamp opening above the aperture.

6. An apparatus according to claim 1 wherein the support frame causes the clamping members to move outwardly toward the channel sides upon contact with the filmstrip when the support frame is urged downwardly to move the clamp from the rest position to the clamping position, so as to transversely tension the filmstrip to reduce any transverse curvature.

7. An apparatus according to claim 1 wherein the lower surfaces of the clamping members are pliable.

8. An apparatus according to claim 6 wherein the support frame comprises two frame flexures each of which extends upward and transversely inward from opposed positions of the clamping members which are lengthwise beyond the aperture.

9. An apparatus according to claim 1 wherein the clamp additionally comprises at least one set of upper and lower parallel arms connected to the support frame and which arms extend an equal distance transversely from respective points on the support frame to respective remote points, so as to maintain the clamping members equidistant from the bottom surface of the channel as the clamping members travel between the rest and clamping positions.

10. An apparatus according to claim 9 wherein the parallel arms are flexures biased to hold the clamp members in the rest position.

11. An apparatus according to claim 9 wherein the parallel arms are connected to the frame at a position transversely intermediate the clamping members.

12. An apparatus according to claim 6 wherein the support frame comprises two frame flexures each of which extends upward and transversely inward from opposed positions of the clamping members which are lengthwise beyond a corresponding end of the aperture; and wherein the clamp additionally comprises first and second parallel sets of upper and lower parallel arm flexures, the arm flexures of each set extending transversely an equal distance from a corresponding frame flexure at a position intermediate the clamping members to respective remote mounting points, which sets of arm flexures maintain the clamping members equidistant from the bottom surface of the channel between the rest and clamping positions.

13. An apparatus according to claim 12 wherein the clamp additionally comprises an upper brace member extending between the two upper arm flexures, and a lower brace member extending between the two lower arm flexures, such that the upper arm flexures and upper brace member and lower arm flexures and lower brace member, define two parallel H shaped members.

14. An apparatus according to claim 1 wherein said clamping members have a length equal to the length of the image frame and at least the width of the channel.

15. A filmstrip holding apparatus for supporting a filmstrip having image frames to be scanned with reduced transverse curl, comprising:
 a) a base defining a channel, the channel including a bottom surface having an aperture and two opposed parallel sides to accommodate the filmstrip lengthwise past the aperture;
 b) a clamp including:
  i) two opposed elongated clamping members;
  ii) a support frame extending between the clamping members to hold them in their opposed relationship,
  iii) the clamp being movable between a rest position in which a lower surface of each clamping member is spaced from the base to allow lengthwise passage of the filmstrip past the aperture, and a clamping position in which the lower surface of each clamping member lies adjacent to the base to capture the filmstrip between the clamping members and the base at positions along the base on opposite sides of the aperture, said clamping members having a length equal to the length of the image frame and at least ½ the width of the channel, so that when the clamps are in the clamping position, the clamping members extend beyond each end of the image frame by a distance equal to at least ¼ the width of the channel; and
  iv) first and second sets of upper and lower parallel arms connected to the support frame, the upper and lower arms extending an equal distance transversely from respective points on the support frame to respective remote points so as to maintain the clamping members equidistant from the bottom surface of the channel as the clamping members travel between the rest and clamping positions.

16. An apparatus according to claim 15 wherein said clamping members have a length equal to the length of the image frame and at least ⅔ the width of the channel.

17. An apparatus according to claim 15 wherein said clamping members have a length equal to the length of the image frame and at least the width of the channel.

18. An apparatus according to claim 15 wherein the support frame causes the clamping members to move outwardly toward the channel sides upon contact with the filmstrip when the support frame is urged downwardly to move the clamp from the rest position to the clamping position, so as to transversely tension the filmstrip to reduce any transverse curvature.

19. An apparatus according to claim 15 wherein the parallel arms are flexures biased to hold the clamping members in the rest position.

* * * * *

UNITED STATES PATENT AND TRADEMARK OFFICE
CERTIFICATE OF CORRECTION

PATENT NO.   : 5,822,045
DATED        : October 13, 1998
INVENTOR(S)  : Gary Lee Erck It is certified that error appears in the above-identified patent and that said Letters Patent is hereby corrected as shown below:

Title page, insert the following item:
   -- [60] Provisional application No. 60/002,783, August 24, 1995. --

Column 1, line 4, insert the following:
   -- CROSS REFERENCE TO RELATED APPLICATION
Reference is made to and priority claimed from U.S. Provisional Application Serial No. 60/002,783, filed August 24, 1995, entitled Filmstrip Holding Apparatus and Method. --

Signed and Sealed this

Fourteenth Day of December, 1999

Attest:

Q. TODD DICKINSON

Attesting Officer       Acting Commissioner of Patents and Trademarks